UNITED STATES PATENT OFFICE

2,677,682
SULFONAMIDO PTERIDINES

Marvin J. Fahrenbach, Pearl River, N. Y., and James M. Smith, Jr., North Plainfield, and Martin E. Hultquist, Bound Brook, N. J., assignors to American Cyanamid Company, New York, N. Y., a corporation of Maine No Drawing. Application August 24, 1951, Serial No. 243,586

7 Claims. (Cl. 260—239.75)

This invention relates to new organic compounds. More particularly, it relates to sulfonamido pteridines and methods of preparing the same.

During the past few years many substituted sulfanilamides have been prepared and described. As a class of compounds their bacteriostatic properties are well recognized.

We have now found that the sulfanilamidopteridines have useful biological properties hereinafter defined. These compounds may be represented by the following general formula:

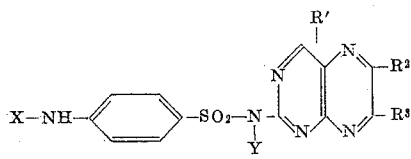

in which X is hydrogen or an acyl radical, Y is hydrogen or a cationic salt-forming radical, R' is hydrogen, hydroxyl, amino or sulfhydryl and $R^2$ and $R^3$ are hydrogen, hydroxyl, alkyl, carboxyl, phenyl and substituted phenyl.

The compounds of the present invention are white to yellow or orange solids, soluble in alkali or in acid, sparingly soluble in water and organic solvents.

They are prepared by reacting a 2-($N^4$-acylsulfanilamido)-4,5-diaminopyrimidine with a vicinal dicarbonyl compound. The process may be illustrated by the following equation:

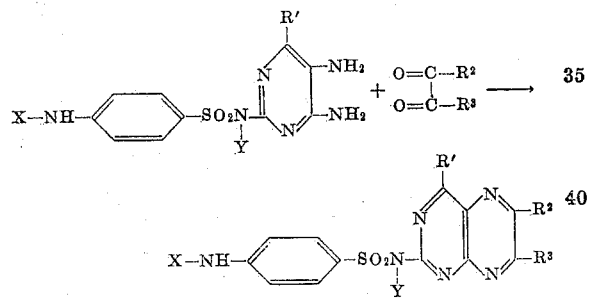

in which X, R', $R^2$, and $R^3$ are as previously defined. The $N^4$-acyl group is subsequently removed by hydrolysis, if desired.

Of the reactants, some of the 2-sulfanilamido-4,5-diaminopyrimidines are new compounds. They can be prepared, for example, by reacting an acylsulfanilyl guanidine with an ester of cyanoacetic acid. The compound obtained is then nitrosated and reduced to give the desired 2-sulfanilamido-4,5-diaminopyrimidine.

The vicinal dicarbonyl compounds may be glyoxal; diacetyl; acetylvaleryl; benzil; oxalic acid esters; glyoxalic acid; pyruvic acid; 4,4'-diaminobenzil; 9,10-phenanthraquinone. Other compounds capable of reacting in the same manner as a vicinal dicarbonyl compound such as isonitrosoacetone; alpha - bromocyclohexanone; chloroacetic acid; dichloroacetic acid; chloroacetic esters.

The reaction to prepare the compounds of the present invention may be carried out at a temperature of from about 0° C. to 100° C., preferably at a temperature of 40° C. to 70° C. The reaction is usually complete in from about 10 minutes to one and one-half hours although under some conditions it may be advantageous to heat several hours.

The reaction can also be carried out in the absence of water in a solvent such as ethylene glycol at temperatures of 100° C. to 130° C. in the presence of sodium methylate. In some instances under these conditions higher yields and purer products are obtained. The reaction is completed at the above temperatures in a matter of a few minutes up to an hour. After cooling, the product is obtained by diluting the reaction mixture with water or an alcohol.

The desired product can be obtained from an aqueous solution by adjusting the pH to the isoelectric point. The product can then be purified by repeated reprecipitations with acid from solutions in aqueous alkali.

The compounds of the present invention may be prepared by other methods such as reacting an acylsulfanilyl chloride with an aminopteridine such as:

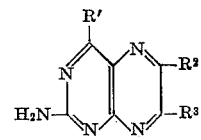

in which R', $R^2$ and $R^3$ are as defined above, in the presence of a solvent such as pyridine. Obviously the reaction can also be carried out by reacting a para-aminobenzene sulfonamide with a pteridine as described immediately above wherein the 2-amino group is replaced with a halogen radical.

The compounds of the present invention have been found to have bacteriostatic properties for acid-fast bacteria such as the tubercle bacillus.

The following examples specifically illustrate the method of preparing sulfonamido pteridines. All parts are by weight unless otherwise indicated.

EXAMPLE 1

To 500 parts of water was added 21.8 parts 2-($N^4$-acetylsulfanilamido) - 4,5-diamino-6-hydroxypyrimidine ½ $H_2SO_4 \cdot H_2O$ and 0.5 parts sodium hydrosulfite ($Na_2S_2O_4$). Concentrated (28%) ammonia was then added until a strong spot on phenolphthalein test paper was obtained. The temperature was raised to 60° C. and 19.4 parts 30% glyoxal solution added. After stirring for 10 minutes at 60° C. 5 N hydrochloric acid was added to the deep orange colored solution until a light blue spot on Congo red test paper was obtained; a cream colored solid precipitated. The temperature was lowered to 10° C. and the solid was filtered off and washed with cold water. The wet cake was slurried in 500 parts water and dissolved with concentrated (28%) ammonia, using as little ammonia as necessary to obtain a solution; 2.5 parts activated charcoal was added and the solution clarified. The light yellow filtrate was heated to 80° C. and acidified slowly with 5 N hydrochloric acid to a bright blue spot on Congo red test paper. The temperature was lowered to 10° C., and the product, 2-($N^4$-acetylsulfanilamido)-4-hydroxy pteridine, was filtered off and washed with water. The above precipitation was repeated twice more. The final product was in the form of very fine light cream colored needles; weight 16.9 parts (87.0% yield); melting point =292°-295° C. (uncorrected).

EXAMPLE 2

To 300 parts water was charged 20 parts sodium hydroxide and 30 parts 2-($N^4$-acetylsulfanilamido)-4-hydroxy pteridine. This solution was heated to a gentle reflux (100°-103° C.) for six hours. At the end of this time 5 N hydrochloric acid was added slowly to the hot solution until a very light brown spot was obtained on Congo red test paper. The temperature was lowered to 30° C. and the deep orange-yellow solid was filtered off and washed well with water. This cake was suspended in 100 parts of water, concentrated (28%) ammonia added until a strong spot on phenolphthalein test paper was obtained and after a momentary complete solution, the ammonium salt precipitated. The temperature was lowered to 5° C. and the ammonium salt was filtered off; the filtrate was acidified to a light-brown spot on Congo red test paper; but almost no solid precipitated and so this solution was discarded. The ammonium salt was slurried in 400 parts of water at 30° C. and 5 N sodium hydroxide was added to give a complete solution. After the temperature had been raised to 60° C., 5 N hydrochloric acid was added slowly to a faint brown spot on Congo red test paper. The temperature was lowered to 30° C. and the deep yellow solid was filtered off and washed well with water. This wet cake was slurried in 400 parts of water at 30° C., 5 N sodium hydroxide was added to a very faint spot on brilliant yellow test paper (complete solution) one part activated charcoal was added and the solution was clarified. To the filtrate at 90° C. was slowly added 5 N hydrochloric acid until a faint brown spot on Congo red test paper was obtained. The temperature was lowered to 30° C. and the solid was filtered off and washed well with water. This cake was reprecipitated once more from dilute sodium hydroxide solution as described above. The product, 2-sulfanilamido-4-hydroxy pteridine, was in the form of brilliant lemon-yellow striated boat-shaped crystals; weight 24.3 parts (91.7% yield); melting point 300°-310° C. with decomposition (uncorrected).

EXAMPLE 3

To 100 parts of water was charged 4.36 parts 2 - ($N^4$ - acetylsulfanilamido) - 4,5 - diamino-6-hydroxypyrimidine ½ $H_2SO_4 \cdot H_2O$, 0.1 part sodium hydrosulfite ($Na_2S_2O_4$) and concentrated (28%) ammonia until a very faint pink spot on phenolphthalein test paper was obtained. The temperature of the solution was raised to 70° C. and 1.72 parts diacetyl was added. The temperature was held at 70° to 75° C. for 10 minutes, then 5 N hydrochloric acid was added until a dark brown spot was obtained on Congo red test paper. After the temperature had been lowered to 10° C., the deep cream-colored product was filtered off and washed well with cold water. This crude material was reprecipitated 4 times by slurrying in 200 parts of water at 40° C., adding concentrated (28%) ammonia until a faint pink spot was obtained on brilliant yellow test paper, then heating the solution to 70° C. and precipitating the product by the slow addition of 5 N hydrochloric acid to a dark brown spot on Congo red test paper; in the last two precipitations 0.5 part activated charcoal was added to the dilute ammonia solution and the solution was clarified before heating and precipitating with dilute hydrochloric acid. A final precipitation was carried out by slurrying the cake in 200 parts water at 35° C., adding 5 N sodium hydroxide until a faint spot on brilliant yellow test paper was obtained, 0.1 part sodium hydrosulfite ($Na_2S_2O_4$) and 0.5 part activated charcoal; and clarifying the solution. The filtrate was heated to 85° C. and 5 N hydrochloric acid was added carefully until there was a dark brown spot on Congo red test paper. The temperature was lowered to 70° C. and the light cream-colored fine fibrous needles were filtered off, washed with water and acetone and dried 3 hours at 50° C. A yield of 3.73 parts (96.2%) of 2-($N^4$-acetylsulfanilamido)-4-hydroxy-6,7-dimethyl pteridine was obtained, melting at 300°-302° C. (uncorrected).

EXAMPLE 4

To 250 parts of water was charged 23.3 parts 2 - ($N^4$ - acetylsulfanilamido) - 4 - hydroxy-6,7-dimethyl pteridine and 11 parts sodium hydroxide and the solution was refluxed (102°-103° C.) for 3 hours. To the hot solution was carefully added 5 N hydrochloric acid until a light brown spot was obtained on Congo red test paper. The yellow precipitate which formed was filtered at 50° C. and washed well with water. This cake was slurried in 1500 parts water at 38° C. and concentrated (28%) ammonia was added to a strong spot on phenolphthalein test paper. All of the solid had not dissolved and so 5 N sodium hydroxide was added until a complete solution was obtained. To this solution was added 1.3 parts activated charcoal. After clarification, the filtrate was heated to 90° C. and acidified slowly with 5 N hydrochloric acid until a faint brown spot was obtained on Congo red test paper. The deep yellow solid was filtered off at 50° C. and washed well with water. This material was precipitated once more as described above, but omitting the ammonia and using only 5 N sodium hydroxide to dissolve the cake. The final 2 - sulfanilamido - 4 - hydroxy - 6,7 - dimethyl pteridine was in the form of very small, dull, light yellow plates; weight 18.4 parts (87.1% yield), having a melting point of 311°-313° C.

EXAMPLE 5

To 50 volumes dry ethylene glycol was added 2.31 parts benzil. The temperature was raised to 120° to 130° C., at which point there was a complete solution. Then 4.36 parts 2-($N^4$-acetylsulfanilamido) - 4,5 - diamino - 6 - hydroxypyrimidine ½ $H_2SO_4 \cdot H_2O$ was added. The sulfate almost completely dissolved to give a deep orange-red solution and after several minutes, a crystalline precipitate began to form. Heating was continued for 15 minutes at 120°–130° C., then the temperature was lowered to 90° C. Fifty volumes ethanol was added and the deep cream-colored solid was filtered off, washed well with ethanol and acetone and dried at 60 C. This solid was slurried in 250 volumes water at 40° C. and 5 N sodium hydroxide was added to a faint spot on benzoazurine test paper; this just dissolved the solid. To the deep yellow solution was added 0.5 part activated charcoal and the solution was clarified. After heating the filtrate to 95° C., 1 N hydrochloric acid was added carefully until a dark brown spot was obtained on Congo red test paper. The deep cream solid was filtered off at 15° C. and washed well with water. This material was precipitated once more in the same manner to give 3.52 parts (66.5% yield) of 2-($N^4$ - acetylsulfanilamido) - 4 - hydroxy - 6,7-diphenyl pteridine in the form of very fine, deep cream-colored needles; melting point (start heating at 300° C.) 330°–331° C.

EXAMPLE 6

To 50 volumes water was charged 2.563 parts 2 - ($N^4$ - acetylsulfanilamido)-4-hydroxy-6,7-diphenyl pteridine and 1.2 parts sodium hydroxide. The deep yellow solution was heated to reflux for 4 hours. Then 150 volumes water was added and the solution was clarified to remove a small amount of dark insoluble material. After heating the filtrate to 95° C., 5 N hydrochloric acid was added carefully until a dark brown spot was obtained on Congo red test paper. A light yellow, very finely crystalline precipitate formed. The temperature was lowered to 20° C. and the product was filtered off and washed with cold water. This solid was dissolved in 250 volumes water with just enough sodium hydroxide to give a faint spot on benzoazurine test paper; then 0.1 part activated charcoal was added and the solution was clarified. After heating the deep yellow filtrate to a boil, 1 N hydrochloric acid was added very slowly until a black spot was obtained on Congo red test paper. The product precipitated as light yellow, very small cigar-shaped crystals. The temperature was lowered to 20° C. and the solid was filtered off, washed with cold water and dried 4 hours at 60° C. A yield of 2.251 parts 2 - sulfanilamido - 4 - hydroxy - 6,7 - diphenyl pteridine ½ $H_2O$ was obtained; melting point (start heating at 300° C.); the product sintered, with decomposition, at 321.5°–323° C. and finally melted, with decomposition, at 355°–357° C.

EXAMPLE 7

To 50 volumes of dry ethylene glycol was added 8.72 parts 2 - ($N^4$ - acetylsulfanilamido) - 4,5 - diamino - 6 - hydroxypyrimidine ½ $H_2SO_4 \cdot H_2O$ and 7.48 parts 4,4′-diaminobenzil. This mixture was heated for 15 minutes at 110°–120° C.; a complete solution occurred and a deep orange color developed. Then 750 volumes water was added to the solution, along with sufficient sodium hydroxide so that there was no spot on brilliant yellow or Congo red test paper. The temperature was lowered to 10° C. and the deep orange amorphous product was filtered off and washed with ice water. This material was precipitated twice by slurrying in 500 volumes water, dissolving by the addition of sodium hydroxide to a faint spot on benzoazurine test paper, adding 0.5 part activated charcoal and clarifying. The deep orange colored filtrate was heated to boiling and 1 N hydrochloric acid was added carefully until there was no spot on Congo red or brilliant yellow test paper. The temperature was then lowered to 10° C. and the deep orange amorphous product was filtered off and washed with ice water. A third precipitation was carried out, as described above, but from dilute hydrochloric acid solution and a final precipitation was done from dilute sodium hydroxide solution. Yield of deep yellow 2-($N^4$-acetylsulfanilamido) - 4 - hydroxy - 6,7 - di - (p - aminophenyl) pteridine $H_2O$ was 9.4 parts (83.8%); it was in the form of fine spherulites; melting point (start heating at 220° C.) fused at about 225° C.; completely melted at 240°–245° C. (decomposition).

This product can be dried to the anhydrous material by drying 7 hours at 180° C. in an Abderhalden drier.

EXAMPLE 8

To 500 volumes water was added 28.0 parts 2 - ($N^4$ - acetylsulfanilamido) - 4 - hydroxy - 6,7 - di-(p-aminophenyl) pteridine $H_2O$ and 12.0 parts sodium hydroxide. This solution was heated to reflux for 4 hours. A small quantity of dark impurity present in the solution at this point was removed by clarification. The filtrate was heated to 95° C. and acidified to a very faint spot on Congo red test paper. The temperature was lowered to 5° C. and the solid was filtered off and washed with a small quantity of ice water. A second precipitation was carried out in the same manner. This solid was purified further by 4 isolations of the sodium salt from 1000 volumes of water and excess sodium hydroxide. A yield of 18.7 parts purified 2-sulfanilamido-4-hydroxy-6,7-di-(p-aminophenyl) pteridine ½ $H_2O$ was obtained in the form of deep orange broad needles; melting point 351°–353° C. decomposition (uncorrected). This product can be dried to the anhydrous material by heating to 100° C. in an Abderhalden drier for 24 hours.

EXAMPLE 9

To 25 volumes dry ethylene glycol was added 4.36 parts 2 - ($N^4$ - acetylsulfanilamido) - 4,5 - diamino-6-hydroxypyrimidine ½ $H_2SO_4 \cdot H_2O$; a solution was obtained by raising the temperature to 120° C. To this hot solution was carefully added small portions of sodium methylate, with stirring, until a faint spot was obtained on moist brilliant yellow test paper. Then 2.082 parts phenanthraquinone was added; a deep orange color developed and soon a deep yellow solid precipitated. Heating and stirring at 120° to 130° C. was continued for 20 minutes longer, then 500 volumes water was added, followed by 5 N sodium hydroxide until a good spot was obtained on benzoazurine test paper. The temperature was raised to 90° C., the solution was diluted to 2000 volumes with water, 0.5 part activated charcoal was added and the solution was clarified hot. After heating the filtrate to a boil, 5 N hydrochloric acid was added slowly until a light blue spot on Congo red test paper was obtained. The temperature was lowered to 30° C., 10 parts diatomaceous earth was added and the deep yellow finely divided solid was filtered off and washed with 100 cc. water. This cake was reprecipitated twice more as described above, but in the final precipitation the alkaline solution was run slowly into a boiling solution which was kept acid to a blue spot on Congo red test paper with hydrochloric acid. A yield of 3.38 parts (66.2%) 2-($N^4$-acetylsulfanilamido) - 6 - hydroxy - phenanthro - (9,10-e) -pyrimido-(4,5-b) -pyrazine was obtained in the form of very fine deep lemon yellow needles; melting point 369°–371° C., decomposition.

EXAMPLE 10

To 250 volumes water were charged 12.0 parts 2 - ($N^4$ - acetylsulfanilamido) - 6 - hydroxy - phenanthro - (9,10 - e) - pyrimido - (4,5 - b) - pyrazine and 5.64 parts sodium hydroxide. The deep red solution was refluxed for 4 hours, then diluted with water to 2,000 volumes and run slowly into 1,000 volumes of boiling water; a dark brown spot on Congo red test paper was maintained by the occasional addition of hydrochloric acid. The temperature was lowered to 70° C. and the solid was filtered off and washed with water. This material was precipitated 3 more times, as above, but using only the minimum amount of sodium hydroxide to dissolve the solid, and clarifying the alkaline solution with activated charcoal. A yield of 8.6 parts (77.8%) of 2-sulfanilamido - 6 - hydroxy - phenanthro - (9,10 - e) -pyrimido-(4,5-b) -pyrazine was obtained in the form of very fine yellow crystals, melting point 358°–361° C., decomposition.

EXAMPLE 11

To 200 volumes dry ethylene glycol was added 65.4 parts 2 - ($N^4$ - acetylsulfanilamido) -4,5-diamino-6-hydroxypyrimidine ½$H_2SO_4.H_2O$. The temperature was raised to 60° C. and then a slurry of one part sodium methylate to 2 volumes dry ethylene glycol was slowly added until the solution gave a faint spot on moist brilliant yellow test paper. Then 0.2 part sodium hydrosulfite ($Na_2S_2O_4$) was added, and the temperature was raised to 120° C. During this time more of the sodium methylate-ethylene glycol slurry was added to maintain a faint spot on moist brilliant yellow test paper; total usage of the sodium methylate glycol slurry was 45 volumes, or approximately 22.5 parts sodium methylate. To this solution at 120° C. 43.8 parts diethyl oxalate was added slowly over a 15 minute period. There was an immediate vigorous reaction and alcohol began to reflux from the solution; also the solution now gave a spot on moist Congo red test paper. Stirring at 120° to 125° C. was continued for one hour after the diethyl oxalate had been added, during which time a deep yellow solid precipitated. The thick slurry was stirred for one hour longer as it was cooled to room temperature and then poured into 1,000 volumes of water at 50° C. Dilute hydrochloric acid was added to a light blue spot on Congo red test paper, the temperature was lowered to 5° C. and the product was filtered off and washed with a small quantity of ice water. The above cake was reprecipitated 3 times by slurrying in 1,500 volumes of water, adding sodium hydroxide to a faint spot on benzoazurine test paper, 0.2 part sodium hydrosulfite ($Na_2S_2O_4$) and 5 parts activated charcoal and clarifying. The filtrate was heated to 95° C., slowly acidified to a light blue spot on Congo red test paper, cooled to 5° C., filtered, and the cake was washed with 200 volumes ice water. A final precipitation was carried out as above, but a volume of 3,000 parts water was used and the dilute alkaline solution was run slowly into a boiling water solution which was maintained acid to Congo red test paper (blue spot), by occasional addition of hydrochloric acid. The deep yellow cream long needles were dried at 50° C. to give 42.7 parts (66.4% yield) 2 - ($N^4$ - acetylsulfanilamido) - 4,6,7 - trihydroxy pteridine 2$H_2O$, melting point: darkens and decomposes at 305°–315° C. This dihydrate can be dried to the anhydrous compound by heating to 100° C. for 20 hours in an Abderhalden drier.

EXAMPLE 12

To 500 volumes water were added 30.0 parts 2 - ($N^4$ - acetylsulfanilamido) - 4,6,7 - trihydroxy pteridine .2$H_2O$ and 22.4 parts sodium hydroxide. The solution was refluxed for 5 hours, then acidified hot with concentrated (36%) hydrochloric acid to a faint brown spot on Congo red test paper. The temperature was lowered to 0° to −2° C. for 2 hours, and the light yellow crystalline solid was filtered off and washed with 200 volumes ice water. The above material was slurried in 800 volumes water. After dissolving the solid with sodium hydroxide, 0.2 part sodium hydrosulfite and 2.0 parts activated charcoal was added and the solution was clarified. The deep yellow filtrate (which appeared to oxidize and discolor on contact with air) was heated to 95° C., 5 N hydrochloric acid was added slowly to a light brown spot on Congo red test paper and the temperature was lowered to 0° C. The dull yellow crystals were filtered off and washed with 200 volumes of ice water. This precipitation was repeated once more. The final product was washed with acetone and dried in a vacuum desiccator to prevent oxidation and discoloration of the product. A yield of 11.6 parts (47.3%) 2-sulfanilamido - 4,6,7 - trihydroxy pteridine was obtained as deep, dull yellow, broad needles; melting point darkened around 315° C., but did not melt as high as 375° C.

EXAMPLE 13

To 400 volumes dry ethylene glycol was charged 120 parts dry (heated 48 hours at 100° C.) $N^4$-acetylsulfanilamido guanidine, 54.0 parts sodium methylate and 113 parts cyanoacetic ester. While bubbling dry nitrogen through the solution to minimize oxidative decomposition, the reaction mixture was heated to 95° to 100° C. for 3 hours, then poured into two and one-half liters cold water. The dark solution was clarified with 2 parts activated charcoal and the filtrate was acidified to a light blue spot on Congo red test paper with concentrated (36%) hydrochloric acid. This cake was reprecipitated twice with hydrochloric acid at 70° C. from 3,000 volumes water with just sufficient ammonia present to dissolve the solid. The basic solution had been clarified with 5 parts activated charcoal and 0.1 part sodium hydrosulfite ($Na_2S_2O_4$) before the precipitation with acid. A yield of 121 parts (74.9%) 2-($N^4$-acetylsulfanilamido)-4-amino-6-hydroxypyrimidine was obtained as fine white needles; melting point 298°–299° C.

EXAMPLE 14

To 150 volumes water was added 3.11 parts 2 - ($N^4$ - acetylsulfanilamido) - 4 - amino - 6-hydroxypyrimidine; 5 N sodium hydroxide was added to give a faint spot on benzoazurine test paper, followed by 0.76 part sodium nitrite.

Then with the temperature at 30° to 35° C., 5 N hydrochloric acid was added slowly until a light blue spot was obtained on Congo red test paper; a deep yellow compound precipitated. The temperature was lowered to 5° C. and the solid was filtered off and washed with a small quantity of ice water. This cake was slurried in 150 volumes water, sodium hydroxide was added to a faint spot on benzoazurine test paper, then 0.1 part sodium nitrite was added. After raising the temperature to 30° to 35° C., 5 N hydrochloric acid was added until a light blue spot on Congo red test paper was obtained. The temperature was lowered to 5° C., the solid was filtered off and washed with a small quantity of ice water. A second precipitation was carried out as described above, but the deep cherry-red alkaline solution was clarified with 0.2 part activated charcoal before acidification with hydrochloric acid. A yield of 2.89 parts (74.2%) 2-($N^4$-acetylsulfanilamido)-4-amino-5-nitroso-6-hydroxypyrimidine 3 $H_2O$ was obtained as fine, light yellow, fibrous needles; melting point decomposition between 220°–225° C. This trihydrate can be dried to the anhydrous material by heating to 100° C. for 7 hours in an Abderhalden drier.

EXAMPLE 15

To 450 volumes water at 38° C. was added 20.3 parts 2-($N^4$-acetylsulfanilamido)-4-amino-5-nitroso-6-hydroxypyrimidine $3H_2O$. Sufficient sodium hydroxide was added to give a faint spot on brilliant yellow test paper; this dissolved the nitroso compound to give a deep cherry-red solution. Then 25 parts sodium hydrosulfite ($Na_2S_2O_4$) was added slowly over a 5 minute period, toward the end of which time the spot disappeared on brilliant yellow test paper and the color of the solution became a deep yellow; the temperature rose to 42° C. To this solution was added 2 parts activated charcoal and the solution was clarified at 40° C. The filtrate was acidified with sulfuric acid to a light blue spot on Congo red test paper, cooled to 10° C., and the deep cream colored solid which precipitated was filtered off and washed with cold water. This cake was slurried in 500 volumes water at 40° C., concentrated (28%) ammonia added until a very faint spot on brilliant yellow test paper was obtained, 0.1 part sodium hydrosulfite ($Na_2S_2O_4$) and 2.0 parts activated charcoal added and the solution was clarified. The very light yellow filtrate was acidified to a light blue spot on Congo red test paper with sulfuric acid, cooled to 10° C. and the light, cream colored, fine needles which precipitated were filtered off, washed with cold water, alcohol and acetone and dried at 50° C. A yield of 15.0 parts (65.9%) 2($N^4$-acetylsulfanilamido)-4,5-diamino-6-hydroxypyrimidine ½$H_2SO_4$·$XH_2O$ was obtained; melting point 210°–215° C., decomposition. The water content of this molecule seems to vary between 1 and 2 moles of water. It has a tendency to develop a pink coloration on long standing in contact with air.

EXAMPLE 16

To 2,000 volumes water was added 174.4 parts 2-($N^4$-acetylsulfanilamido)-4,5-diamino-6-hydroxypyrimidine ½$H_2SO_4$·$H_2O$, 102.6 parts acetyl valeryl, and 300 volumes concentrated (28%) ammonia. A small quantity of sodium hydrosulfite ($Na_2S_2O_4$) was added to decolorize the solution and then the temperature was raised to 80° to 85° C. for one-half hour. At the end of this time the slurry was cooled to 5° C. for one hour, filtered and the cake was washed with a small quantity of ice water; the mother liquor from this first ammonium salt was discarded. The above material was purified twice more by isolation of the ammonium salt. The free sulfonamide was isolated by slurrying the third ammonium salt in 1600 volumes water, dissolving with sufficient 5 N sodium hydroxide at 55° to 60° C., clarifying with 1.0 part activated charcoal and precipitating at 40° C. by the slow addition of 1 N hydrochloric acid to a light brown spot on Congo red test paper. After cooling the slurry to 5° C. for one hour the deep cream colored fine prismatic crystals were filtered off, washed with a small quantity of cold water and dried at 40° C. A yield of 11.0 parts 2-($N^4$-acetylsulfanilamido)-4-hydroxy-6-(or 7)-butyl-7-(or 6)-methyl pteridine was obtained; melting point 241°–243° C. Call this: Fraction A.

Further material was obtained from the 2nd and 3rd ammonium salt mother liquors by acidifying with hydrochloric acid to a light brown spot on Congo red test paper and isolating the solid. This solid was then purified by isolation of ammonium salts, and a total of 12.0 parts material was obtained in several fractions melting from 237°–239° C. to 246°–248° C. Call this: Fraction B.

EXAMPLE 17

Fraction A

To 250 parts water was added 11.0 parts 2-($N'$-acetylsulfanilamido)-4-hydroxy-6-(or 7)-butyl-7-(or 6)-methyl pteridine from 16, Fraction A, and 6.16 parts sodium hydroxide. The solution was refluxed for 4 hours, then cooled to 40° C. and acidified carefully with 2 N hydrochloric acid to a very faint spot on Congo red test paper. The temperature was lowered to 5° C. and the solid was filtered off and washed with a small quantity of cold water. This solid was precipitated twice as above from 500 volumes dilute sodium hydroxide solution with hydrochloric acid; 0.5 part activated charcoal was used in each case in the clarification of the dilute sodium hydroxide solutions. A yield of 7.6 parts light, dull yellow 2-sulfanilamido-4-hydroxy-6-(or 7)-butyl-7-(or 6)-methyl pteridine was obtained; melting point (start heating at 230° C.) = 247°–250° C. (uncorrected).

Fraction B

This hydrolysis was carried out using the 12.0 parts 2-($N^4$-acetylsulfanilamido)-4-hydroxy-7-(or 6)-butyl-6-(or 7)-methyl pteridine from 16, Fraction B, 6.68 parts sodium hydroxide and 250 volumes water. The hydrolysis and purification were performed as described above for Fraction A. A yield of 8.0 parts light, dull yellow solid was obtained with melting point (start heating at 100° C.) of 197°–198° C. (uncorrected). The ultra-violet maximum of this material in 0.1 N NaOH and 0.1 N hydrochloric acid were the same as those found for the product in Fraction A. It is felt that this is the isomer of Fraction A, with the butyl and methyl groups reversed in positions 6 and 7 of the pteridine ring.

We claim:

1. Compounds having the general formula:

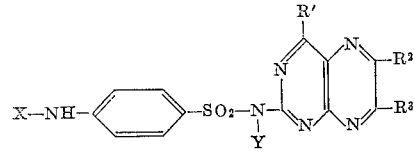

in which X is a member of the group consisting of hydrogen and acyl radicals, Y is a member of the group consisting of hydrogen and alkali metal, alkaline earth metal and ammonium radicals, R' is a hydroxyl radical and R² and R³ are members of the group consisting of hydrogen, hydroxyl, lower alkyl, phenyl and aminophenyl radicals.

2. Compounds having the general formula:

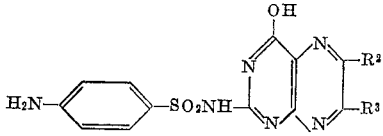

in which R² and R³ are lower alkyl radicals.

3. Compounds having the general formula:

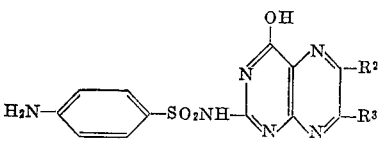

in which R² and R³ are aminophenyl radicals.

4. 2-sulfanilamido-4-hydroxypteridine.

5. 2-sulfanilamido - 4 - hydroxy - 6,7 - dimethyl pteridine.

6. 2 - sulfanilamido - 4 - hydroxy - 6,7 - diphenyl pteridine.

7. 2-sulfanilamido-4,6,7-trihydroxy pteridine.

References Cited in the file of this patent

UNITED STATES PATENTS

| Number | Name | Date |
|---|---|---|
| 2,442,836 | Angier | June 8, 1948 |
| 2,476,557 | Martin et al. | July 19, 1949 |

FOREIGN PATENTS

| Number | Country | Date |
|---|---|---|
| 555,865 | Great Britain | Sept. 10, 1943 |
| 882,813 | France | June 16, 1943 |
| 928,698 | France | Dec. 4, 1947 |

OTHER REFERENCES

Forrest et al.: J. Chem. Soc. (London), 1949, pp. 2002–7.